US007084781B2

(12) United States Patent
Chuey

(10) Patent No.: US 7,084,781 B2
(45) Date of Patent: Aug. 1, 2006

(54) PROGRAMMABLE VEHICLE-BASED APPLIANCE REMOTE CONTROL

(75) Inventor: Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 211 days.

(21) Appl. No.: 10/630,064

(22) Filed: Jul. 30, 2003

(65) Prior Publication Data

US 2005/0024230 A1 Feb. 3, 2005

(51) Int. Cl.

| | |
|---|---|
| ***G08C 19/00*** | (2006.01) |
| ***G05B 23/02*** | (2006.01) |
| ***G05B 23/00*** | (2006.01) |
| ***B60R 25/00*** | (2006.01) |
| ***G06F 7/00*** | (2006.01) |

(52) U.S. Cl. ............................... 340/825.72; 340/3.71; 340/5.71

(58) Field of Classification Search ........... 340/825.72, 340/825.69, 825.52, 825.22, 3.71, 5.7, 5.8, 340/7.55, 7.56, 825.24, 825.25, 825.29
See application file for complete search history.

(56) References Cited

U.S. PATENT DOCUMENTS

| | | | |
|---|---|---|---|
| 1,522,241 | A | 1/1925 | Hennessey |
| 3,098,212 | A | 7/1963 | Creamer, Jr. |
| 3,300,867 | A | 1/1967 | Sampson |
| 3,337,992 | A | 8/1967 | Tolson |
| 3,456,387 | A | 7/1969 | Tolson |
| 3,680,951 | A | 8/1972 | Jordan et al. |
| 4,074,200 | A | 2/1978 | Buchta |
| 4,167,833 | A | 9/1979 | Farina et al. |
| 4,241,870 | A | 12/1980 | Marcus |
| 4,247,850 | A | 1/1981 | Marcus |
| 4,425,717 | A | 1/1984 | Marcus |
| 4,447,808 | A | 5/1984 | Marcus |
| 4,453,161 | A | 6/1984 | Lemelson |
| 4,535,333 | A | 8/1985 | Twardowski |
| 4,581,827 | A | 4/1986 | Higashi |
| 4,595,228 | A | 6/1986 | Chu |
| 4,598,287 | A | 7/1986 | Osakabe et al. |
| 4,623,887 | A | 11/1986 | Welles, II |
| 4,631,708 | A | 12/1986 | Wood et al. |
| 4,635,033 | A | 1/1987 | Inukai et al. |
| 4,638,433 | A | 1/1987 | Schindler |
| 4,676,601 | A | 6/1987 | Itoh et al. |
| 4,700,327 | A | 10/1987 | Hilton |

(Continued)

FOREIGN PATENT DOCUMENTS

GB 2 182 790 A 10/1986

(Continued)

OTHER PUBLICATIONS

Garage Door/Gate Remote Control User's Instructions (Model 39), Skylink Technologies Inc., 2002.

(Continued)

*Primary Examiner*—Michael Horabik
*Assistant Examiner*—Nam Nguyen
(74) *Attorney, Agent, or Firm*—Brooks Kushman P.C.

(57) ABSTRACT

A universal in-vehicle remote control automatically assists in appliance activation configuration. The appliance responds to a radio frequency activation signal having characteristics represented by one of a plurality of activation schemes. The user is automatically prompted to select one of a plurality of subsets of possible activation schemes. For each activation scheme in the subset, an activation signal is transmitted. User input is received indicating whether or not at least one transmitted activation signal successfully activates the appliance. If the user input indicates success, data representing the activation scheme is associated with a user activation input channel.

28 Claims, 9 Drawing Sheets

U.S. PATENT DOCUMENTS 4,707,788 A 11/1987 Tashiro et al.
RE32,576 E 1/1988 Pastore
4,727,302 A 2/1988 Mizuta et al.
4,743,905 A 5/1988 Wiegand
4,747,159 A 5/1988 Kato
4,750,118 A 6/1988 Heitschel et al.
4,754,255 A 6/1988 Sanders et al.
4,771,283 A 9/1988 Imoto
4,793,690 A 12/1988 Gahan et al.
4,799,189 A 1/1989 Grover
4,806,930 A 2/1989 Wojciak, Jr.
4,825,200 A 4/1989 Evans et al.
4,881,148 A 11/1989 Lambropoulos et al.
4,882,565 A 11/1989 Gallmeyer
4,886,960 A 12/1989 Molyneux et al.
4,890,108 A 12/1989 Drori et al.
4,896,030 A 1/1990 Miyaji
4,905,279 A 2/1990 Nishio
4,917,477 A 4/1990 Bechtel et al.
4,953,305 A 9/1990 Van Lente et al.
4,978,944 A 12/1990 Andros et al.
4,988,992 A 1/1991 Heitschel et al.
5,016,996 A 5/1991 Ueno
5,064,274 A 11/1991 Alten
5,103,221 A 4/1992 Memmola
5,109,222 A 4/1992 Welty
5,113,821 A 5/1992 Fukui et al.
5,122,647 A 6/1992 Lynam et al.
5,123,008 A 6/1992 Beesley
5,126,686 A 6/1992 Tam
5,146,215 A 9/1992 Drori
5,154,617 A 10/1992 Suman et al.
5,181,423 A 1/1993 Philipps et al.
5,191,610 A 3/1993 Hill et al.
5,201,067 A 4/1993 Grube et al.
5,225,847 A 7/1993 Roberts et al.
5,243,322 A 9/1993 Thompson et al.
5,252,960 A 10/1993 Duhame
5,252,977 A 10/1993 Lueker et al.
5,266,945 A 11/1993 Peek et al.
5,278,547 A 1/1994 Suman et al.
5,369,706 A 11/1994 Latka
5,379,453 A 1/1995 Tigwell
5,402,105 A 3/1995 Doyle et al.
5,408,698 A 4/1995 Serizawa et al.
5,420,925 A 5/1995 Michaels
5,442,340 A 8/1995 Dykema
5,455,716 A 10/1995 Suman et al.
5,463,374 A 10/1995 Mendez et al.
5,471,668 A 11/1995 Soenen et al.
5,473,317 A 12/1995 Inomata et al.
5,475,366 A 12/1995 Van Lente et al.
5,479,155 A 12/1995 Zeinstra et al.
5,517,187 A 5/1996 Bruwer et al.
5,554,977 A 9/1996 Jablonski, Jr.
RE35,364 E 10/1996 Heitschel et al.
5,564,101 A 10/1996 Eisfeld et al.
5,583,485 A 12/1996 Van Lente et al.
5,594,429 A 1/1997 Nakahara
5,596,316 A 1/1997 Honeck
5,598,475 A 1/1997 Soenen et al.
5,613,732 A 3/1997 Demick
5,614,885 A 3/1997 Van Lente et al.
5,614,891 A 3/1997 Zeinstra et al.
5,619,190 A 4/1997 Duckworth et al.
5,627,529 A 5/1997 Duckworth et al.
5,645,308 A 7/1997 Fink
5,646,701 A 7/1997 Duckworth et al.
5,661,455 A 8/1997 Van Lente et al.
5,661,651 A 8/1997 Geschke et al.
5,661,804 A 8/1997 Dykema et al.
5,680,131 A 10/1997 Utz
5,680,134 A 10/1997 Tsui
5,686,903 A 11/1997 Duckworth et al.
5,686,904 A 11/1997 Bruwer
5,691,848 A 11/1997 Van Lente et al.
5,699,044 A 12/1997 Van Lente et al.
5,699,054 A 12/1997 Duckworth
5,699,055 A 12/1997 Dykema et al.
5,708,415 A 1/1998 Van Lente et al.
5,715,020 A 2/1998 Kuroiwa et al.
5,731,756 A 3/1998 Roddy
5,751,224 A 5/1998 Fitzgibbon
5,793,300 A 8/1998 Suman et al.
5,812,097 A 9/1998 Maldonado
5,831,548 A 11/1998 Fitzgibbon
5,838,255 A 11/1998 Di Croce
5,841,253 A 11/1998 Fitzgibbon et al.
5,841,390 A 11/1998 Tsui
5,841,813 A 11/1998 van Nee
5,845,593 A 12/1998 Birkestrand
5,854,593 A 12/1998 Dykema et al.
5,872,513 A 2/1999 Fitzgibbon et al.
5,903,226 A 5/1999 Suman et al.
5,926,087 A 7/1999 Busch et al.
5,926,106 A 7/1999 Beran et al.
5,940,000 A 8/1999 Dykema
5,940,007 A 8/1999 Brinkmeyer et al.
5,940,120 A 8/1999 Frankhouse et al.
5,949,349 A 9/1999 Farris et al.
6,002,332 A 12/1999 King
6,005,508 A 12/1999 Tsui
6,008,735 A 12/1999 Chiloyan et al.
6,021,319 A 2/2000 Tigwell
6,025,785 A 2/2000 Farris et al.
6,031,465 A 2/2000 Burgess
6,043,753 A 3/2000 Okayasu et al.
6,049,289 A 4/2000 Waggamon et al.
6,055,508 A 4/2000 Naor et al.
RE36,703 E 5/2000 Heitschel et al.
6,072,436 A 6/2000 Marougi
6,078,271 A 6/2000 Roddy et al.
6,081,203 A 6/2000 Fitzgibbon
6,091,343 A 7/2000 Dykema et al.
6,104,101 A * 8/2000 Miller et al. ............... 307/10.1
6,127,740 A 10/2000 Roddy et al.
6,130,625 A 10/2000 Harvey
6,131,019 A 10/2000 King
6,137,421 A 10/2000 Dykema
6,154,544 A 11/2000 Farris et al.
6,166,650 A 12/2000 Bruwer
6,175,312 B1 1/2001 Bruwer et al.
6,181,255 B1 1/2001 Crimmins et al.
6,191,701 B1 2/2001 Bruwer
6,243,000 B1 6/2001 Tsui
6,249,673 B1 6/2001 Tsui
6,271,765 B1 8/2001 King et al.
6,282,152 B1 * 8/2001 Kurple ........................ 368/10
6,308,083 B1 10/2001 King
6,320,514 B1 11/2001 Flick
6,333,698 B1 12/2001 Roddy
6,344,817 B1 2/2002 Verzulli
6,359,558 B1 3/2002 Tsui
6,362,771 B1 3/2002 Schofield et al.
6,414,587 B1 7/2002 Fitzgibbon
6,441,719 B1 8/2002 Tsui
6,486,795 B1 11/2002 Sobel et al.
RE37,986 E 2/2003 Heitschel et al.
6,525,645 B1 2/2003 King et al.
6,542,076 B1 * 4/2003 Joao .......................... 307/10.2
6,556,681 B1 4/2003 King
6,556,813 B1 4/2003 Tsui
6,559,775 B1 5/2003 King
6,597,291 B1 7/2003 Tsui

| | | | | |
|---|---|---|---|---|
| 6,634,408 | B1 | 10/2003 | Mays | |
| 6,661,350 | B1 * | 12/2003 | Rohrberg et al. | 340/825.69 |
| 6,690,796 | B1 | 2/2004 | Farris et al. | |
| 6,703,941 | B1 | 3/2004 | Blaker | |
| 6,759,943 | B1 * | 7/2004 | Lucy et al. | 340/5.72 |
| 6,791,467 | B1 * | 9/2004 | Ben-Ze'ev | 340/825.69 |
| 6,810,123 | B1 | 10/2004 | Farris et al. | |
| 6,822,603 | B1 | 11/2004 | Crimmins et al. | |
| 6,956,460 | B1 | 10/2005 | Tsui | |
| 2002/0034303 | A1 | 3/2002 | Farris et al. | |
| 2002/0067826 | A1 | 6/2002 | King | |
| 2002/0075133 | A1 | 6/2002 | Flick | |
| 2002/0126037 | A1 | 9/2002 | Fitzgibbon | |
| 2002/0137479 | A1 | 9/2002 | Tsui | |
| 2002/0140569 | A1 | 10/2002 | van Ee et al. | |
| 2002/0163440 | A1 | 11/2002 | Tsui | |
| 2002/0190872 | A1 | 12/2002 | Suman et al. | |
| 2002/0191794 | A1 | 12/2002 | Farris et al. | |
| 2002/0197955 | A1 | 12/2002 | Witkowski et al. | |
| 2003/0016119 | A1 | 1/2003 | Teich | |
| 2003/0016139 | A1 | 1/2003 | Teich | |
| 2003/0033540 | A1 | 2/2003 | Fitzgibbon | |
| 2003/0067394 | A1 | 4/2003 | Tsui | |
| 2003/0076235 | A1 | 4/2003 | Tsui | |
| 2003/0085798 | A1 | 5/2003 | Esteban | |
| 2003/0118187 | A1 | 6/2003 | Fitzgibbon | |
| 2003/0189530 | A1 | 10/2003 | Tsui | |
| 2003/0197594 | A1 | 10/2003 | Olson et al. | |
| 2003/0197595 | A1 | 10/2003 | Olson et al. | |
| 2003/0216139 | A1 | 11/2003 | Olson et al. | |
| 2003/0228879 | A1 | 12/2003 | Witkowski et al. | |
| 2004/0048622 | A1 | 3/2004 | Witkowski et al. | |
| 2004/0061591 | A1 | 4/2004 | Teich | |
| 2004/0066936 | A1 | 4/2004 | Farris et al. | |
| 2004/0110472 | A1 | 6/2004 | Witkowski et al. | |
| 2004/0243813 | A1 | 12/2004 | Farris et al. | |
| 2005/0024184 | A1 | 2/2005 | Chuey | |
| 2005/0024185 | A1 | 2/2005 | Chuey | |
| 2005/0024229 | A1 | 2/2005 | Chuey | |
| 2005/0024230 | A1 | 2/2005 | Chuey | |
| 2005/0024254 | A1 | 2/2005 | Chuey | |
| 2005/0024255 | A1 | 2/2005 | Chuey | |
| 2005/0026601 | A1 | 2/2005 | Chuey | |
| 2005/0026602 | A1 | 2/2005 | Chuey | |
| 2005/0026605 | A1 | 2/2005 | Guthrie et al. | |

FOREIGN PATENT DOCUMENTS

| | | |
|---|---|---|
| GB | 2 302 751 A | 6/1996 |
| GB | 2 336 433 | 4/1999 |
| GB | 2335773 A | 9/1999 |
| GB | 2 366 433 A | 5/2000 |
| WO | WO 94/02920 | 7/1993 |
| WO | WO 00/29699 | 5/2000 |

OTHER PUBLICATIONS

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report Under Sections 17 and 18 (3), Sep. 25, 2003.

Combined Search and Examination Report Under Sections 17 and 18 (3) mailed Nov. 30, 2004 for the corresponding European patent application GB 0415908.3.

Combined Search and Examination Report Under Sections 17 and 18 (3) mailed Nov. 2, 2004 for European patent application GB0416753.2.

Combined Search and Examination Report Under Sections 17 and 18 (3) mailed Nov. 2, 2004 for European patent application GB 0416789.6.

Combined Search and Examination Report Under Sections 17 and 18 (3) for European Application No. GB 0416742.5 dated Oct. 26, 2004.

German Search/Examination Document, German Patent Application No. 103 14 228.2, Dec. 14, 2004.

* cited by examiner

PROGRAMMABLE VEHICLE-BASED APPLIANCE REMOTE CONTROL

BACKGROUND OF THE INVENTION

1. Field of the Invention

The present invention relates to in-vehicle wireless remote control of appliances such as, for example, garage door openers.

2. Background Art

Home appliances, such as garage door openers, security dates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment remote control. Such functionality includes decreased size, multiple appliance interoperability, increased performance, and the like. Aftermarket controllers are also purchased to replace lost or damaged controllers or to simply provide another remote control for accessing the appliance.

An application for aftermarket remote controls is remote garage door openers integrated into an automotive vehicle. These integrated remote controls provide customer convenience, appliance interoperability, increased safety, and enhanced vehicle value. Present in-vehicle integrated remote controls provide a "universal" or programmable garage door opener which learns characteristics of an existing transmitter then, when prompted by a user, generates an activation signal having the same characteristics. One problem with such devices is the difficulty experienced by users in programming these devices.

Automotive vehicles increasingly include a wide variety of standard features and options which interact with a user. Examples include in-vehicle entertainment systems, graphical mapping and positioning systems, integrated telephones, artificial speech status and information systems, voice recognition systems, and the like. These systems allow users to input and receive extensive amounts of information and complex concepts.

What is needed is to incorporate advances in human-vehicle interfaces into the sometimes complex and confusing process of programming a remote appliance controller.

SUMMARY OF THE INVENTION

The present invention provides a universal in-vehicle remote control that automatically assists in appliance activation configuration.

A method of programming a vehicle-based remote control to activate an appliance is provided. The appliance responds to a radio frequency activation signal having characteristics represented by one of a plurality of activation schemes. The user is automatically prompted to select one of a plurality of subsets of possible activation schemes. User input selecting a particular subset is received. For each of at least one activation scheme in the subset, an activation signal is transmitted having characteristics represented by the activation scheme. User input is received indicating whether or not the at least one transmitted activation signal successfully activated the appliance. If user input indicates success, data representing the activation scheme is stored associated with a user activation input channel. If the user input indicates no success and if the particular subset includes at least one untried activation scheme, another activation signal is transmitted and resulting user input is received.

In an embodiment of the present invention, automatically prompting the user includes displaying an image of each possible existing appliance remote control transmitter together with a code representative of that transmitter. The user input selecting a particular subset may include the code representing a user selected transmitter.

In another embodiment of the present invention, an image of at least one possible existing appliance remote control transmitter is displayed on an in-vehicle interactive display. The user selects a particular subset from at least one selection control indicating selection of a displayed image.

In still another embodiment of the present invention, prompting the user includes asking the user to speak a name associated with the appliance. A particular subset is selected by receiving the spoken name.

In yet another embodiment of the present invention, the user is automatically prompted to enter at least a portion of a name associated with the appliance on a telephone keypad. A particular subset is selected based on receiving characters entered on the telephone keypad.

In a further embodiment of the present invention, a determination is made that the particular subset selected by the user includes a rolling code scheme. The user is then automatically prompted to put the appliance in learn mode.

In yet a further embodiment of the present invention, the particular subset selected by the user includes a fixed code scheme. The user may be automatically prompted to manually enter the fixed code, to operate an existing transmitter which transmits an activation signal containing the fixed code, and/or to participate in guess-and-test selection based on transmission of a sequence of activation signals, each signal in the sequence based on a different fixed code value.

In a still further embodiment of the present invention, if the user input indicates no success and if no other activation scheme in the particular selected subset remains, a help mode is automatically entered.

A method of activating an appliance is also provided. In a learn mode, a first user input is received selecting one of a plurality of possible appliance classes. At least one activation signal is transmitted, each transmitted activation signal based on characteristics of a member of the selected class. Data representing characteristics of at least one transmitted activation signal are stored based on receiving second user input indicating that at least one of the transmitted activation signals activated the appliance. The stored data is associated with an activation input. When in operate mode, an activation input is received. Stored data representing activation signal characteristics is retrieved. At least one activation signal is transmitted based on the retrieved data.

A programmable appliance remote control is also provided. The remote control includes a user interface, a transmitter and memory holding a plurality of activation schemes. Control logic operates in a learn mode and an operate mode. In the learn mode, the control logic accepts a subset selection through the user interface. At least one activation signal having characteristics specified by a selected subset of activation signals is transmitted. A user selection input is received through the user interface selecting at least one activation scheme in response to a transmitted activation signal. Data representing the user selection is stored associated with an activation input. In the operate mode, the control logic receives an activation input and transmits at least one activation signal using stored data based on the received activation input.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
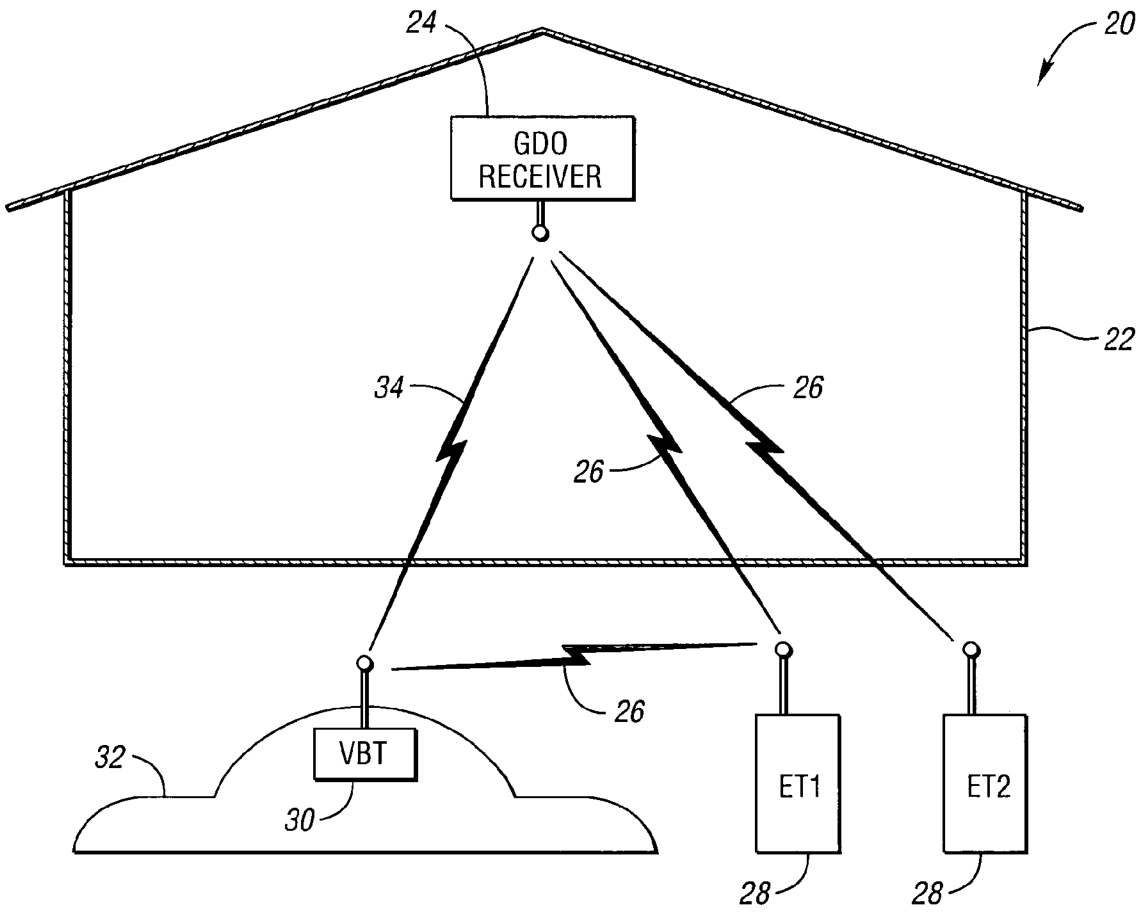
FIG. 1 is a block diagram illustrating an appliance control system according to an embodiment of the present invention.

Referring to FIG. 1, a block diagram illustrating an appliance control system according to an embodiment of the present invention is shown. An appliance control system, shown generally by 20, allows one or more appliances to be remotely controlled using radio transmitters. In the example shown, radio frequency remote controls are used to operate a garage door opener. However, the present invention may be applied to controlling a wide variety of appliances such as other mechanical barriers, lighting, alarm systems, temperature control systems, and the like.

Appliance control system 20 includes garage 22 having a garage door, not shown. Garage door opener (GDO) receiver 24 receives radio frequency control signals 26 for controlling a garage door opener. Activation signals have a transmission scheme which may be represented as a set of activation signal characteristics. One or more existing transmitters (ET) 28 generate radio frequency activation signals 26 recognized by receiver 24 in response to a user depressing an activation button.

A user of appliance control system 20 may wish to add a new transmitter to system 20. For example, vehicle-based programmable controller 30 may be installed in vehicle 32, which may be parked in garage 22. Vehicle-based transceiver 30 generates activation signals 34, including activation signal 26 accepted by receiver 24.

Figure 2:
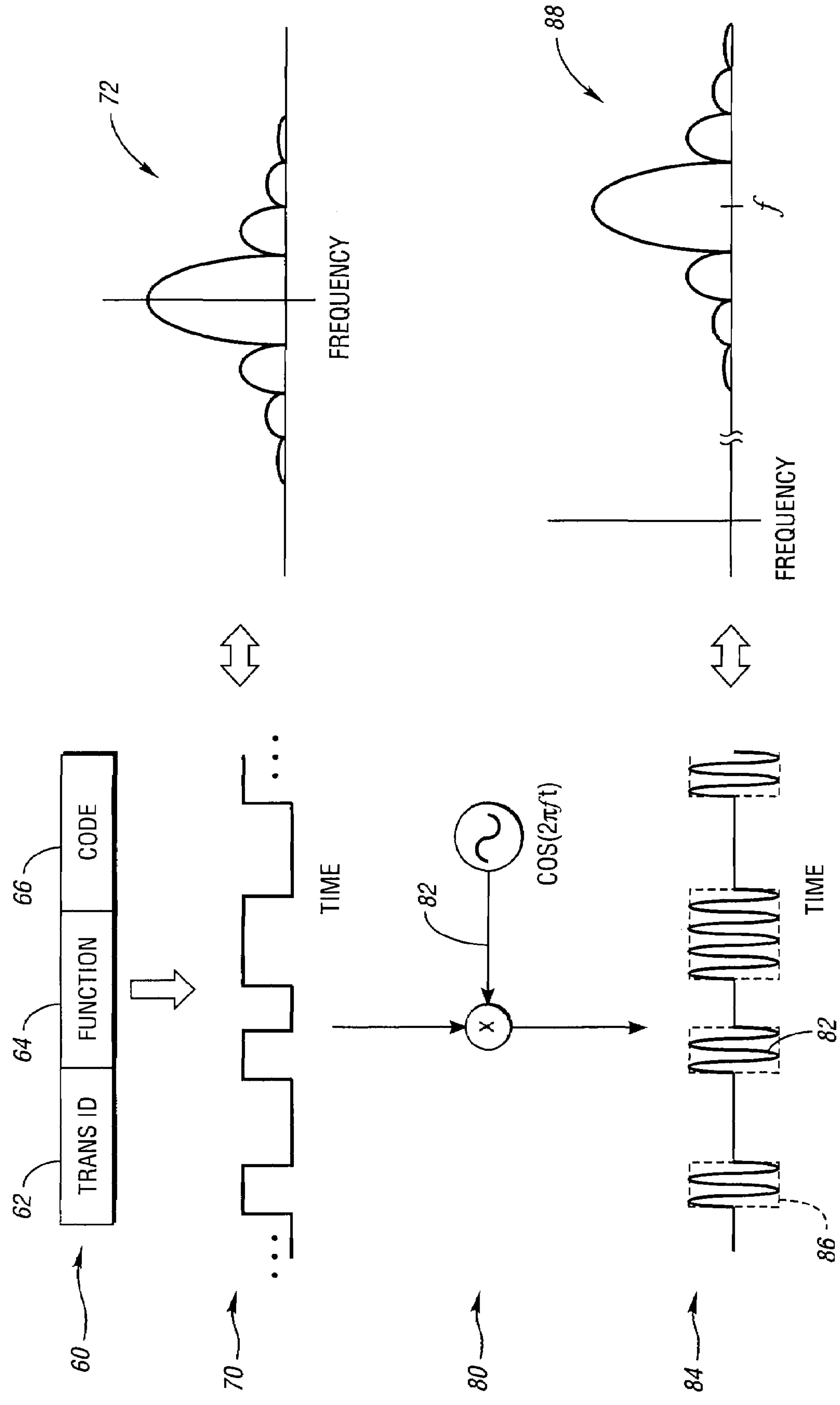
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level. Various baseband encoding or modulation schemes are possible, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 to be centered around the carrier frequency, f, of carrier 82.

Figure 3:
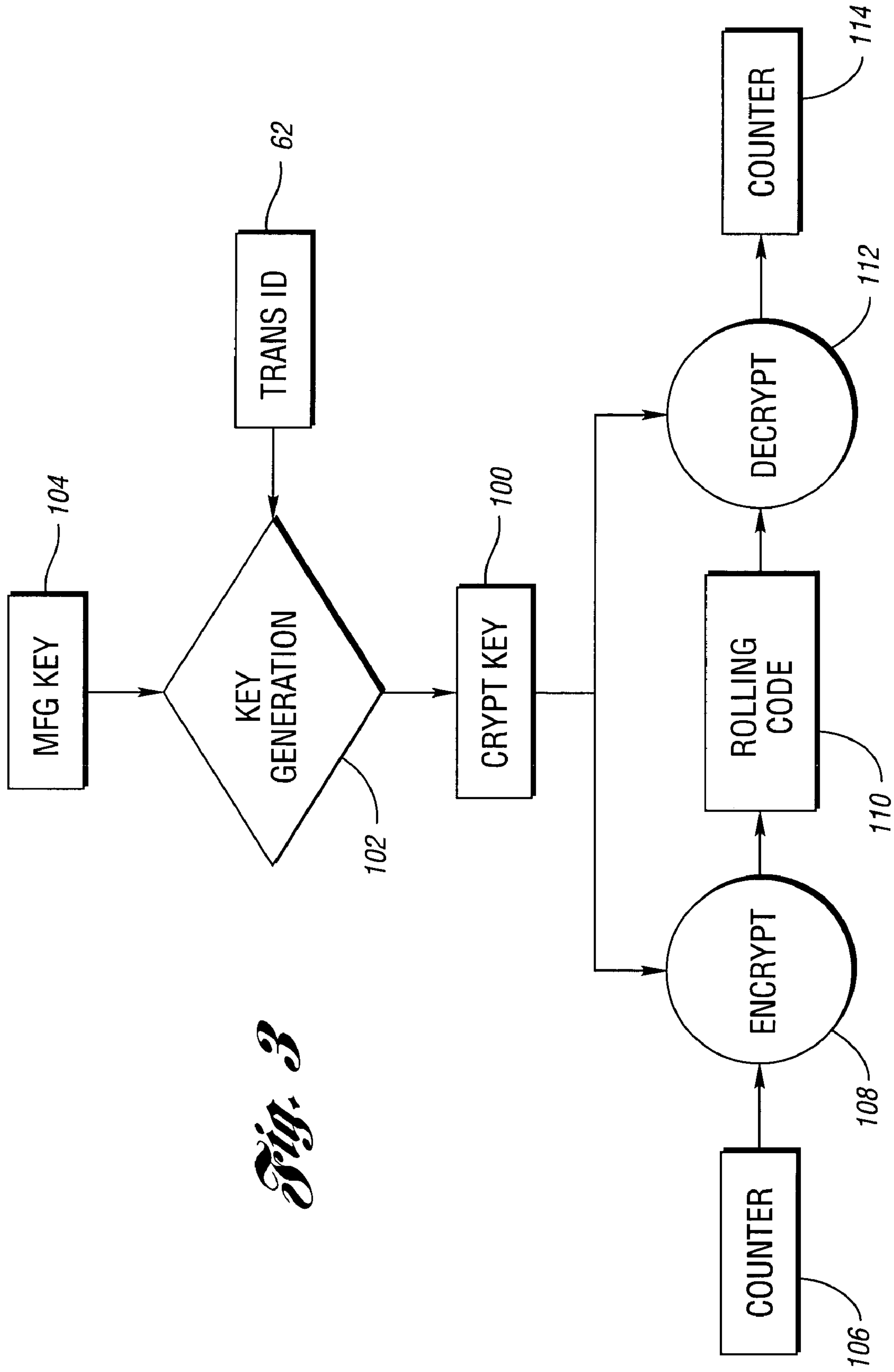
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. In a well-designed rolling code scheme, crypt key 100 is never transmitted from the transmitter to the receiver. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code 110 from counter 106 using crypt key 100. The transmitted activation signal includes rolling code 110 and transmitter identifier 62.

A rolling code receiver is trained to a compatible transmitter prior to operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the seed entered, for example, by pushing a particular combination of buttons. The receiver uses the "seed" to generate crypt key 100. As will be recognized by one of ordinary skill in the art, the present invention applies to the use of a "seed" for generating a crypt key as well as to any other variable code scheme.

Figure 4:
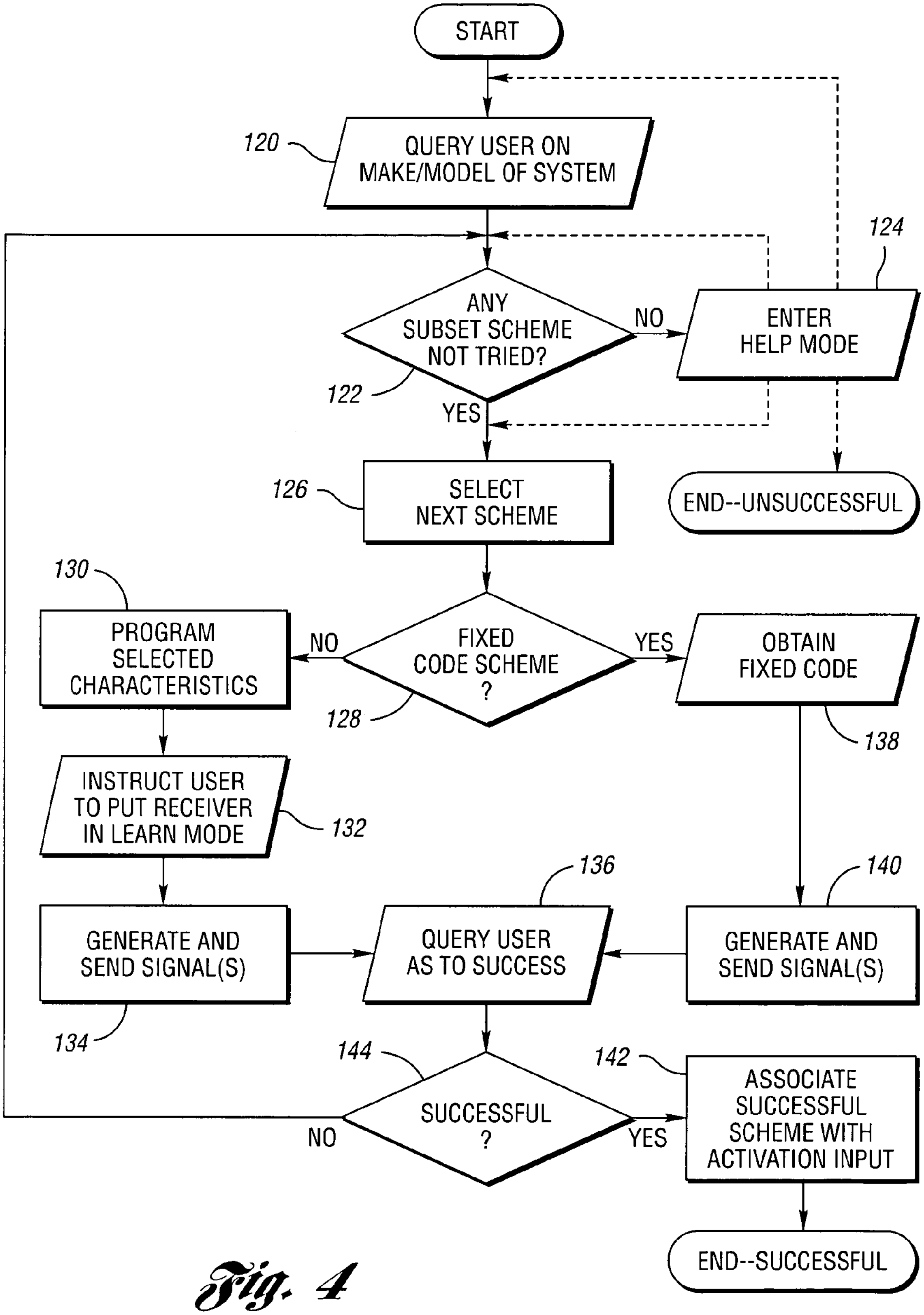
FIG. 4 is a flow diagram illustrating remote control programming according to an embodiment of the present invention.

Referring now to FIG. 4, a flow diagram illustrating remote control programming according to an embodiment of the present invention is shown. Controller programming takes place in a learn mode. As will be appreciated by one of ordinary skill in the art, the operations illustrated are not necessarily sequential operations. Similarly, operations may be performed by software, hardware, or a combination of both. The present invention transcends any particular implementation and the aspects are shown in sequential flowchart form for ease of illustration.

Learn mode is typically entered as a result of some action taken by a user wishing to program the controller. The controller typically has a plurality of channels, each of which is associated with an activation input. For example, a controller may interface to a user input having one push-button for each channel. One method to enter learn mode for a particular channel is to push and hold the channel push-button for an extended period of time. Pressing the push-button for a short period of time indicates an activation input. Other types of user interfaces are also possible within the spirit and scope of the present invention.

Upon entering learn mode, the user is queried to enter information about the appliance to which the controller is being programmed, as in block 120. This may take the form of selecting or entering data specifying the appliance make and/or model. The programmable controller uses the entered information to limit the number of possible activation schemes that will successfully operate the appliance. The set of all possible activation schemes is divided into subsets, one of which is selected based on the user response to the appliance query.

A guess-and-test method is used to select between multiple activation schemes in the chosen subset and to verify operation of the appropriate activation scheme. A check is made to determine if any subset schemes have not been tried, as in block 122. If no scheme remains untried and no scheme has been determined to successfully activate the appliance, a help mode is entered, as in block 124. If any schemes remain untried, the next untried scheme is selected, as in block 126.

A check is made to determine whether or not the current scheme uses a fixed code, as in block 128. If not, characteristics for the current scheme are programmed, as in block 130. The user is instructed to put the appliance receiver in learn mode, as in block 132. Preferably, the user is automatically prompted by and audio and/or visual instruction or signal. For example, if a graphical display is available, an image of the appliance receiver showing the learn button location can be shown. At least one activation signal is generated and transmitted, as in block 134. Rolling code activation signals are based on a data word that includes a transmitter identifier and a rolling code. The rolling code is determined by encrypting a counter value with a crypt key. The data word is used to modulate a carrier having parameters described by the rolling code scheme.

Considering again block 128, if the selected scheme is a fixed code scheme, the fixed code is obtained, as in block 138. There are at least three ways to obtain a fixed code. First, the user can be prompted to manually enter the fixed code. Typically, the fixed code is set by jumpers or switches in an existing transmitter and the appliance receiver. By examining either the existing transmitter or the appliance receiver, the user can determine the fixed code.

A second way to obtain the fixed code is to prompt the user to activate an existing transmitter. The programmable controller receives the activation signal and extracts the fixed code.

A third way to obtain the fixed code is to transmit activation signals having different fixed code values until the appropriate fixed code value is determined. This form of fixed code guess-and-test can be accomplished in several ways. For example, a sequence of activation signals containing different fixed codes can be rapidly transmitted until the user indicates appliance activation. Since there may be a time delay between transmission of an activation signal with the correct fixed code and when activation is detected, the most recently transmitted activation signals can be retransmitted at a slower rate until the user responds indicating another successful activation.

Another fixed code guess-and-test scheme transmits small groups of activation signals having different fixed codes. For example, ten activation signals may be sent in rapid succession. The user indicates which set activates the appliance. The programmable controller stores data indicating the successful set and retransmits the entire set each time the user asserts the associated activation input.

Yet another fixed code guess-and-test scheme transmits half of the possible fixed code activation signals. The user is then asked whether or not activation occurred. If so, half of the previously transmitted activation signals are transmitted. If not, half of the untransmitted activation signals are transmitted. With each transmission, half of the possible activation codes remaining are eliminated. This divide-and-conquer process continues until the correct activation signal, or a small set of activation signals containing the correct activation signal, has been determined.

The user is queried as to the success of each transmission or set of transmissions, as in block 136. A check is made to determine whether the user indicated success or not, as in block 144. If not successful, a check is made to determine if any schemes remain untried, as in block 122. If successful, the successful scheme or schemes is associated with an activation input, as in block 142. The learn mode is then exited.

Once an activation input channel is successfully programmed with an activation scheme, operate mode is entered. Thenceforth, when an activation input is received from a user, the activation scheme is retrieved and one or more activation signals are generated and transmitted.

Help mode, indicated by block 124 in FIG. 4, is entered when no scheme in the selected subset produces an activation signal activating the appliance. The help mode is designed to assist the user in determining why successful programming did not occur and how the problem can be resolved. In its simplest form, the help mode may display an indication to the user that programming was not successful. This may be accomplished by flashing indicator lights, generating a particular tonal pattern, displaying text on a display screen, or the like. Preferably, the help mode prompts the user for additional input. For example, the user may be prompted to select a different make/model of appliance to test. The user may also be asked to repeat the same subset under different conditions such as, for example, moving the vehicle closer to the appliance, changing batteries in the existing transmitter, and the like. If the vehicle includes a built-in telephone system, a call may be placed to determine if any updates to the selected subset are available. If so, these updates can be automatically downloaded and the user requested to repeat the subset guess-and-test. The user may also be connected to an operator or an automated call center capable of troubleshooting the problem or otherwise assisting the user.

Figure 5:
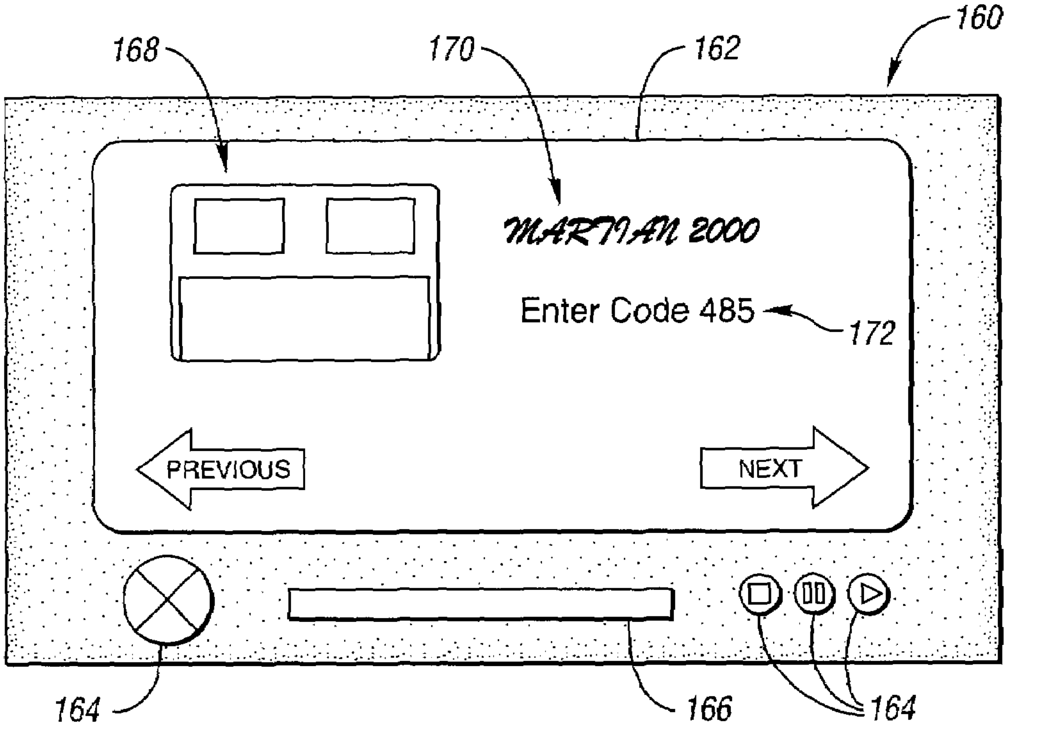
FIG. 5 is a schematic diagram illustrating user prompting with a video entertainment system according to an embodiment of the present invention.

Referring now to FIG. 5, a schematic diagram illustrating user prompting with a video entertainment system according to an embodiment of the present invention is shown. A video entertainment system, shown generally by 160, includes display screen 162, controls 164 and compartment 166 receiving recorded media such as optical disks, magnetic tapes, and the like. Display screen 162 displays one or both of transmitter image 168 and trade name 170. Transmitter image 168 is a photograph or representation of existing transmitter 28 for operating appliance receiver 24. Trade name 170 is a user recognizable term for the appliance being programmed. Trade name 170 may include one or more of the manufacturer, distributor, make, and model of the appliance. Video entertainment system 160 displays possible transmitter image 168 and/or trade name 170 automatically or under control supplied by the user. Preferably, video entertainment system 160 is electronically linked with programmable controller 30 allowing the user to make a subset selection using controls 164. Alternatively, display 162 includes code value 172 which can be entered by the user preferably, on a numeric keypad, by pressing a sequence of control inputs, or the like.

Figure 6:
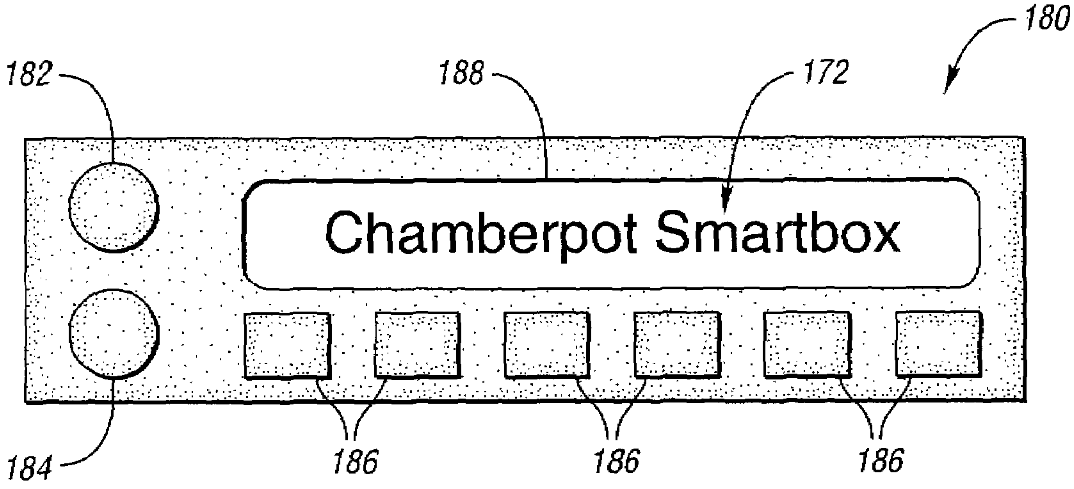
FIG. 6 is a schematic diagram illustrating user prompting with an in-vehicle radio according to an embodiment of the present invention.

Referring now to FIG. 6, a schematic diagram illustrating user prompting with an in-vehicle radio according to an embodiment of the present invention is shown. A broadcast radio receiver, shown generally by 180, includes volume control 182, tuning control 184, channel select buttons 186 and alphanumeric display 188. By turning one or both of volume control 182 and tuning control 184, the user causes different trade names 170 to appear on display 188. In one embodiment, volume control 182 may be used to select between different manufacturers, distributors and makes and tuning control 184 can select different models. Once the user has displayed the appropriate trade name 170, volume control 182, tuning control 184 or channel select button 186 is depressed to transmit the selection. If the appliance is activated by a fixed code, volume control 182 and/or tuning control 184 may be used to enter the fixed code value. For example, rotating one knob may sequentially cycle through the most significant bits of the code and rotating the other knob may sequentially cycle through the least significant bits of the code.

Figure 7:
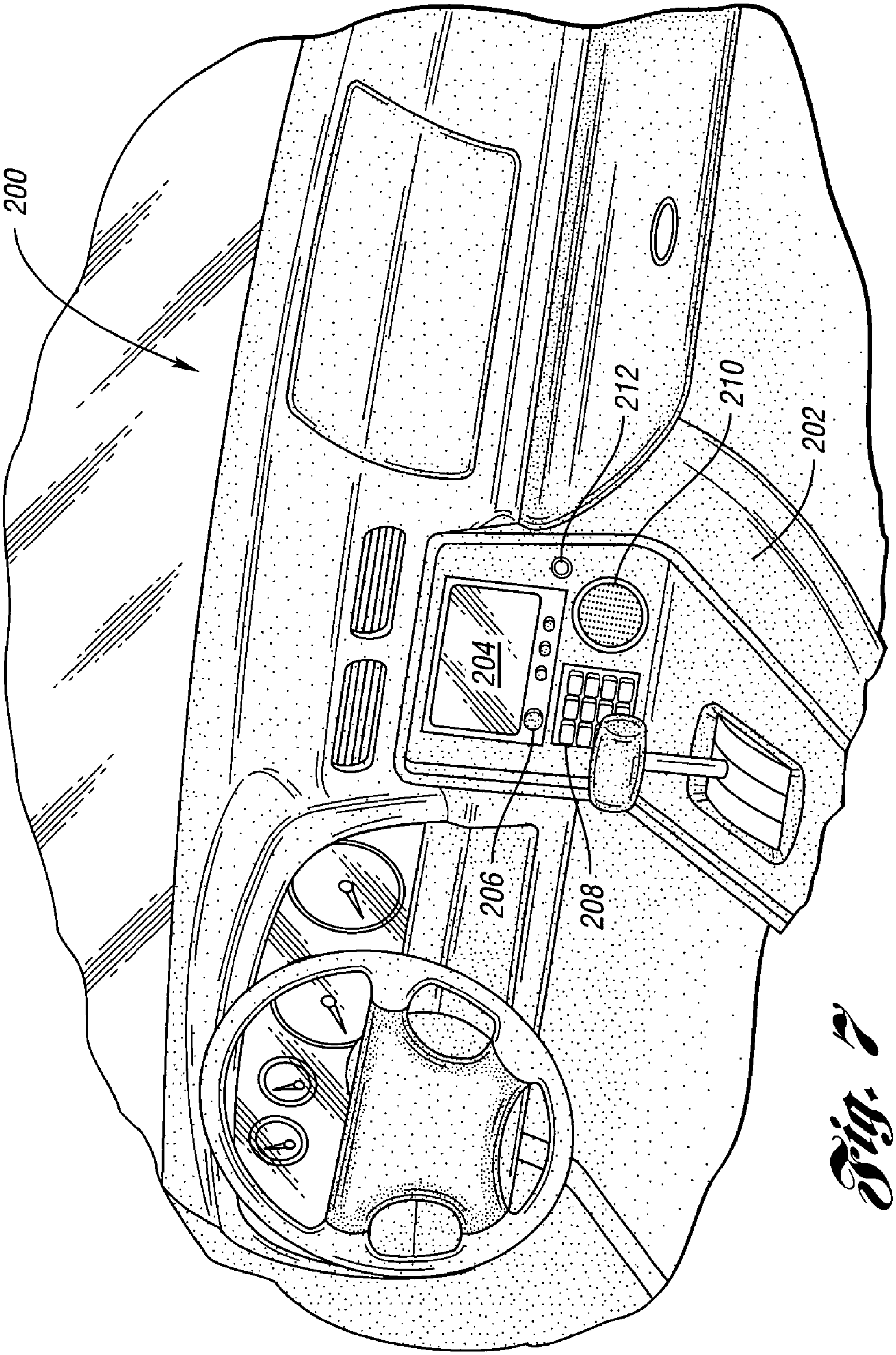
FIG. 7 is a drawing illustrating a vehicle interior that may be used to prompt the user according to an embodiment of the present invention.

Referring now to FIG. 7, a drawing illustrating a vehicle interior that may be used to prompt a user according to an embodiment of the present invention is shown. A vehicle interior, shown generally by 200, includes console 202 having one or more of a variety of user interface components. Graphical display 204 and associated display controls 206 provide an interactive device for HVAC control, radio control, lighting control, vehicle status and information display, map and positioning display, routing and path planning information, and the like. In programmable controller learn mode, graphical display 204 displays one or more appliance images, transmitter images 168, trade names 170, or the like. The user can select one of the displayed items by touching graphical display 204 or through manipulating display controls 206.

Console 202 includes numeric keypad 208 associated with an in-vehicle telephone. In learn mode, numeric keypad 208 can be used to enter a code stored on graphical display 204, video entertainment system 160, looked up by the user on printed matter, and the like. Keypad 208 can also be used to enter an alphanumeric trade name using letters and numbers commonly assigned to the keys. A shortened version of the trade name may be entered. For example, garage door opener having the name "Open Sesame" may be indicated by entering 6736 on keypad 208.

Console 202 may also include speaker 210 and microphone 212 associated with an in-vehicle telephone, voice activated control system, entertainment system, audible warning system, and the like. The user can obtain instructions and subset designations from speaker 210. The user can provide subset selection and activation input by speaking into microphone 212.

Figure 8:
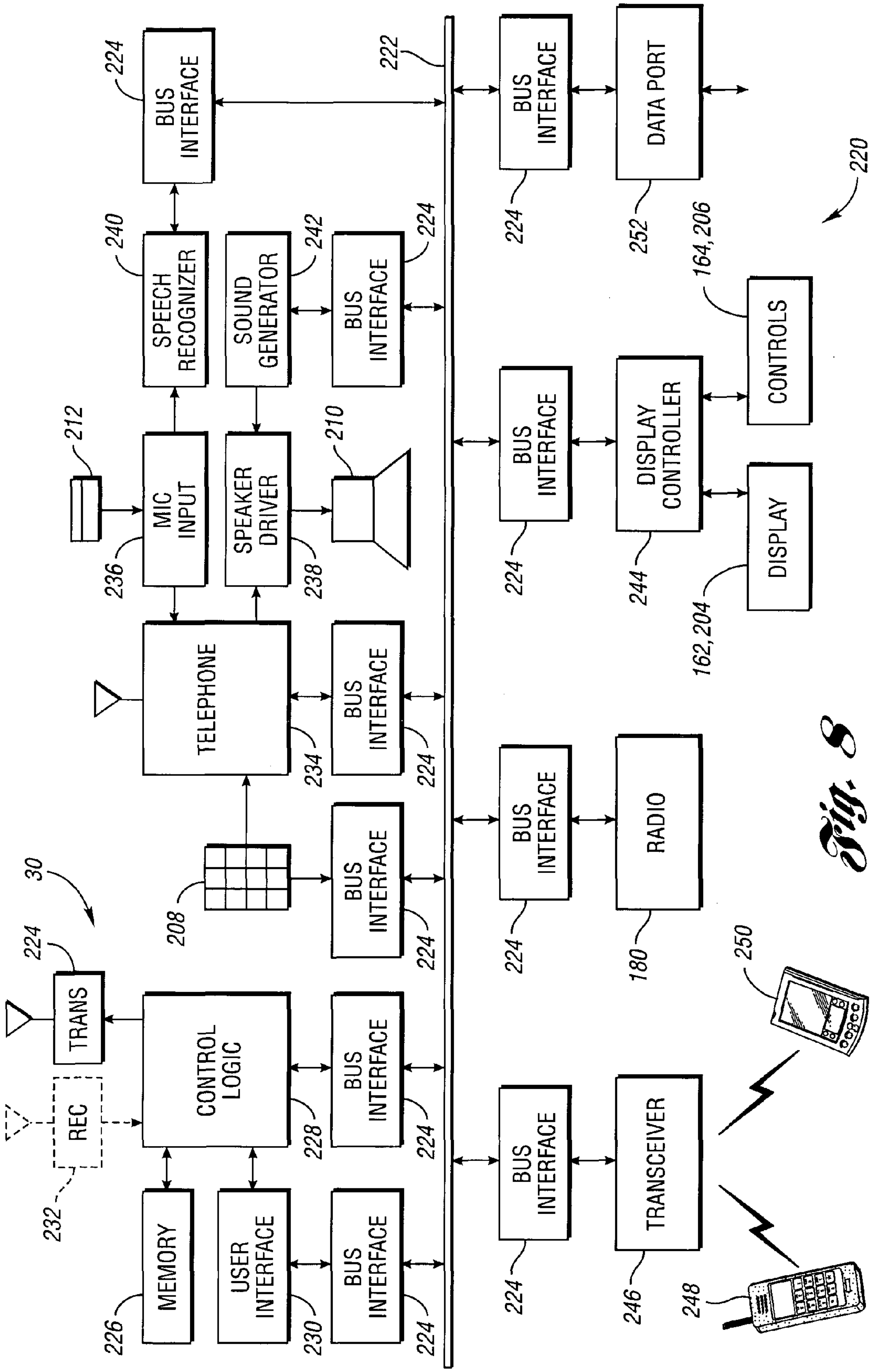
FIG. 8 is a block diagram of an automotive electronics system according to an embodiment of the present invention.

Referring now to FIG. 8, a block diagram of an automotive electronics system according to an embodiment of the present invention is shown. An electronic system, shown generally by 220, includes interconnecting bus 222. Automotive communication buses may be used to interconnect a wide variety of components within the vehicle, some of which may function as interface devices for programming or activating appliance controls. Many standards exist for specifying bus operation such as, for example, SAE J-1850, Controller Area Network (CAN), and the like. Various manufacturers provide bus interfaces 224 that handle low level signaling, handshaking, protocol implementation and other bus communication operations.

Electronics system 220 includes programmable controller 30 comprising transmitter 224, memory 226, control logic 228 and user interface 230. Transmitter 224 transmits radio frequency activation signals having a wide range of characteristics. Memory 226 holds a plurality of activation schemes, each scheme assigned to one of a plurality of subsets. Each scheme describes activation characteristics used by control logic 228 to transmit activation signals by transmitter 224. User interface 230 interfaces control logic 228 with user activation inputs and outputs, not shown. Typically, one, two or three pushbuttons are used as activation inputs. Each pushbutton corresponds with one activation channel. User output is typically provided by one or more indicator lamps, with one lamp assigned to each channel. User interface 230 may be directly connected to control logic 228 or may be connected through bus 222. This latter option allows control logic 228 and transmitter 224 to be located anywhere within vehicle 32.

Control logic 228 operates in a learn mode and an operate mode. In the learn mode, control logic 228 receives a subset selection from the user. Control logic 228 controls transmitter 224 to transmit at least one activation signal having characteristics specified by the selected subset. Control logic 228 receives a user selection input selecting at least one activation scheme in response to at least one transmitted activation signal. Control logic 228 stores data representing the user selection associated with an activation input in nonvolatile memory 226. In operate mode, control logic 228 receives an activation input through user interface 230. Control logic 228 commands transmitter 224 to transmit at least one activation signal using data stored in memory 226 based on the received activation input.

Programmable controller 30 may also include receiver 232 for receiving an activation signal. Receiver 232 forwards data extracted from the received activation signal to control logic 228. Control logic 228 may use this data to determine a fixed code value, carrier frequency, transmitter type, and the like.

Electronics system 220 may include wireless telephone 234 interfaced to bus 222. Telephone 234 can receive input from keypad 208 and from microphone 212 through microphone input 236. Telephone 234 provides audio output to speaker 210 through speaker driver 238. Telephone 234 may be used to contact a human or automated help system and may also be used to download scheme and software updates into memory 226.

Keypad 208 may be directly interfaced to bus 222 allowing keypad 208 to provide user input to control logic 228. Microphone 212 provides voice input through microphone input 236 to speech recognizer 240. Speech recognizer 240 is interfaced to bus 222 allowing microphone 212 to provide input for control logic 228. Sound generator 242 supplies audible signals to speaker 210 through speaker driver 238. Sound generator may be capable of supplying tone-based signals and/or artificial speech signals. Sound generator 242 is interfaced to bus 222 allowing control logic 228 to send audible signals to a user.

Display controller 244 generates signals controlling display 162, 204 and accepts display control input 164, 206. Display controller 244 is interfaced to bus 222 allowing control logic 228 to initiate graphical output on display 162, 204 and receive user input from controls 164, 206.

Radio 180 is interfaced to bus 222 allowing control logic 228 to initiate display through radio 180 and receive input from controls on radio 180.

Wireless transceiver 246 is interfaced to bus 222 through bus interface 224. Wireless transceiver 246 communicates with wireless communication devices, represented by 248 and 250, such as portable telephones, personal digital assistants, laptop computers, and the like, through infrared or short range radio frequency signals. Various standards exist for such communications including IEEE 802.11, Bluetooth, IrDA, and the like. Transceiver 246 is interfaced to bus 222 permitting wireless devices 248, 250 to provide input to and receive output from control logic 228. Wireless devices 248, 250 may also be used to upload code and scheme data into memory 226 and/or to exchange data with controller 30 for assisting in programming controller 30.

Data port 252 is interfaced to bus 222 through bus interface 224. Data port 252 provides a plug or other interface for exchanging digital information. One or more standards may be supported, such as IEEE 1394, RS-232, SCSI, USB, PCMCIA, and the like. Proprietary information exchange or vehicle diagnostic ports may also be supported. Data port 252 may be used to upload code and scheme data into memory 226 and/or exchange data with controller 30 for assisting in programming controller 30.

Figure 9:
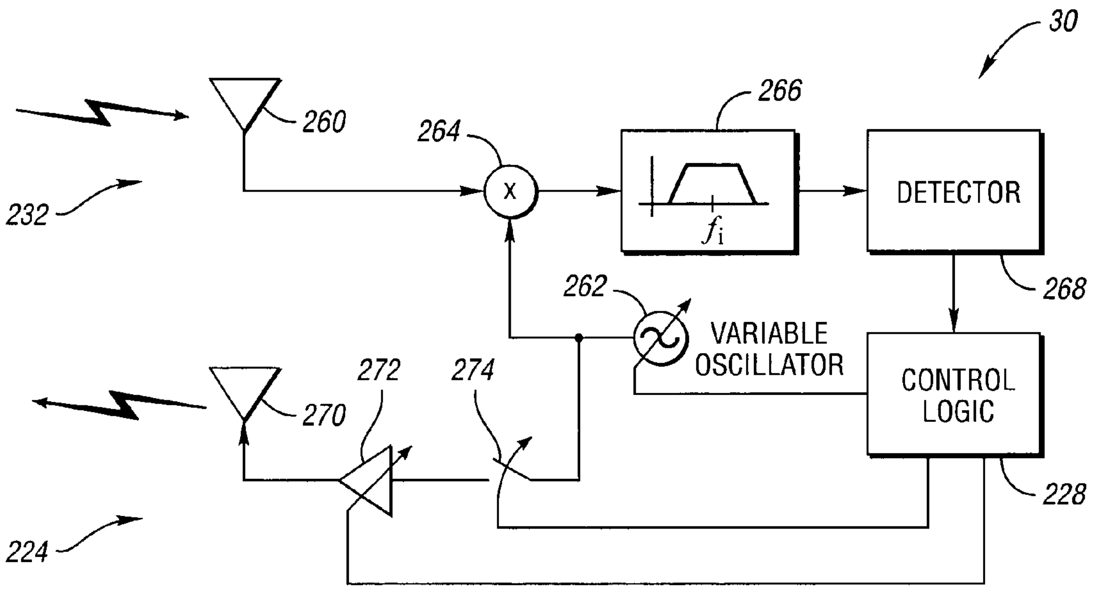
FIG. 9 is a block diagram of a programmable transceiver according to an embodiment of the present invention.

Referring now to FIG. 9, a block diagram of a programmable transceiver according to an embodiment of the present invention is shown. Programmable controller 30 includes receiver section 232 and transmitter section 224. Receiver section 232 includes antenna 260, variable oscillator 262, mixer 264, intermediate filter 266 and detector 268. An activation signal is received by antenna 260. Mixer 264 accepts the receive signal and a carrier frequency sinusoid from variable oscillator 262. Mixer 264 remodulates the received signal so that the broadband spectrum is centered about frequencies which are the sum and difference of the received signal carrier frequency and the variable oscillator carrier frequency. Control logic 228 varies the frequency of variable oscillator 262 until one of the remodulated components falls within the bandwidth of fixed, narrow band intermediate filter 266. Filter 266 passes this component and rejects all other signals. As will be recognized by one of ordinary skill in the art, receiver 232 functions as a superheterodyne receiver. Detector 268 converts the filtered signal into a baseband signal. Detector 268 may be implemented as a simple envelope detector. When control logic 228 receives valid data from detector 268, variable oscillator 262 is tuned to permit a received signal to pass through intermediate filter 266. If control logic 228 knows the intermediate frequency of filter 266, control logic 228 can determined the carrier frequency of the received signal.

Transmitter section 224 includes antenna 270, which may be the same as antenna 260, variable gain amplifier 272, modulator 274, variable oscillator 262 and control logic 228. For transmitting, control logic 228 sets variable oscillator 262 to the desired carrier frequency. Control logic 228 then modulates the carrier frequency with modulator 274, here modeled as a switch. Control logic 228 sets variable gain amplifier 272 to provide the maximum allowed signal strength. The amplified signal is transmitted by antenna 270.

Components which make up transmitter 224 and receiver 232 in programmable controller 30 shown in FIG. 5 are well know in the art of radio communications. Examples of circuits which may be used to implement programmable controller 30 can be found in U.S. Pat. No. 5,614,891, titled Vehicle Accessory Trainable Transmitter, and U.S. Pat. No. 5,686,903, titled Trainable RF Transceiver; both of which are herein incorporated by reference in their entirety.

Figure 10:
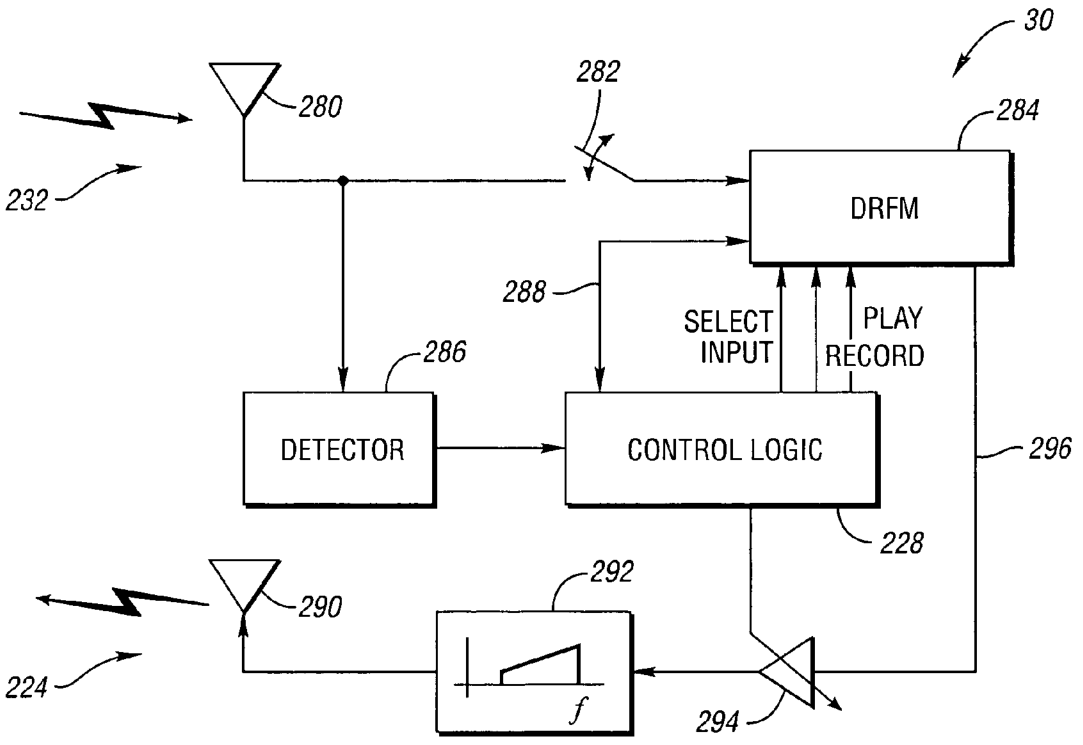
FIG. 10 is a block diagram of an alternative programmable transceiver according to an embodiment of the present invention.

Referring now to FIG. 10, a block diagram of an alternative programmable transceiver according to an embodiment of the present invention is shown. Programmable controller 30 includes transmitter section 224 and receiver section 232. Receiver section 232 includes antenna 280, sampler 282, digital radio frequency memory (DRFM) 284, detector 286 and control logic 228. Control logic 228 monitors the output of detector 286, which receives input from antenna 280. When control logic 228 detects valid data from detector 286, control logic 228 waits until a period when the carrier is present on the signaled received with antenna 280. Control logic 228 asserts the “record” input into DRFM 284. By asserting “play” and “select,” control logic 228 can shift the sampled carrier from DRFM 284 into control logic 228 over bus 288.

Transmitter section 224 includes antenna 290, which may be the same as antenna 280, filter 292, variable gain amplifier 294, DRFM 284 and control logic 228. Control logic 228 can load DRFM 284 with a sampled carrier stream by asserting "select" and "record," then shifting the carrier stream into DRFM 284 on bus 182. The bit stream representing a carrier may have been previously received and sampled or may be preloaded into control logic 228. Control logic 228 generates a modulated carrier on DRFM output 296 by asserting the "play" control line with the desired data word. The amplitude modulated signal on DRFM output 296 is amplified by variable gain amplifier 294 and filtered by filter 292 before transmission by antenna 290.

A DRFM transceiver similar to the system depicted in FIG. 10 is described in U.S. patent application Ser. No. 10/306,077, titled Programmable Transmitter And Receiver Including Digital Radio Frequency Memory, filed Nov. 27, 2002, which is herein incorporated by reference in its entirety.

Figure 11:
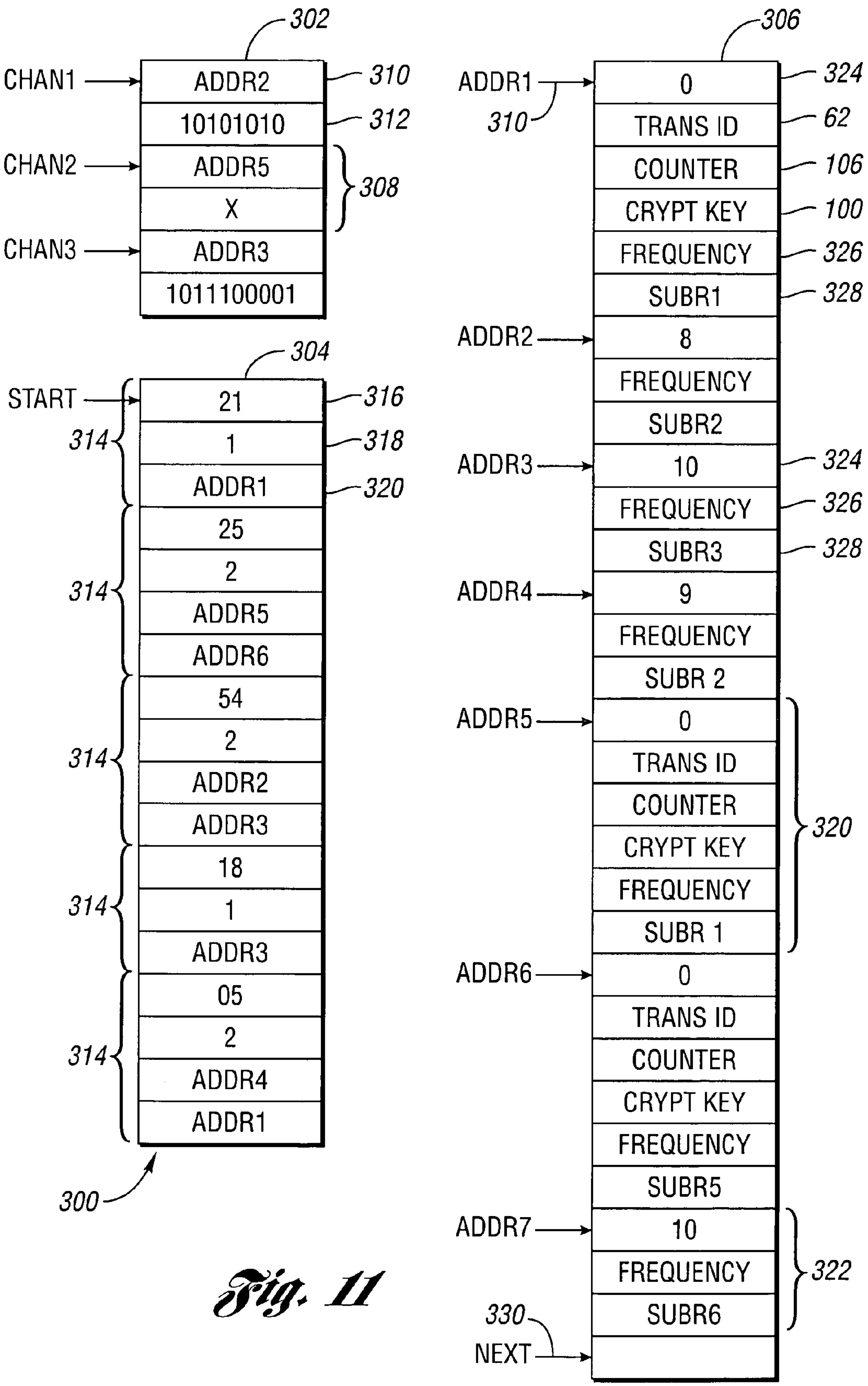
FIG. 11 is a schematic diagram of a memory map illustrating activation scheme subsets according to an embodiment of the present invention.

Referring now to FIG. 11, a schematic diagram of a memory map illustrating activation scheme subsets according to an embodiment of the present invention is shown. A memory map, shown generally by 300, represents the allocation of memory for data tables within programmable controller 30. Preferably, this data is held in non-volatile memory. Memory map 300 includes channel table 302, subset table 304 and scheme table 306.

Channel table 302 includes a channel entry, one of which is indicated by 308, for each channel supported by programmable controller 30. Typically, each channel corresponds to a user activation input. In the illustrated example, three channels are supported. Each channel 308 has two fields, scheme address 310 and fixed code 312. Scheme address 310 points to a scheme in scheme table 306 which has been programmed to an activation input channel. Fixed code value 312 holds the programmed fixed code for a fixed code mode scheme. Fixed code value 312 may also hold function code 64 in fixed code schemes. For fixed code schemes transmitting multiple activation signals upon receiving an activation input, only the most significant bits of fixed code 312 are relevant. For example, if eight activation signals are transmitted upon receiving an activation input from a user, the three least significant bits of fixed code 312 are varied amongst the transmissions. Fixed code value 312 may hold function code 64 or may not be used at all in a channel programmed for a rolling code scheme.

Subset table 304 defines a plurality of subsets 314. Each subset 314 includes subset code 316, count 318 and at least one scheme address 310. Subset code 316 provides a unique subset indicator. Each subset code 316 corresponds with one possible selection of an appliance provided by a user programming controller 30. Subset count 318 indicates the number of entries in scheme table 306 belonging to subset 314. Subset country 318 is followed by a number of scheme addresses 310 equal to the value of subset count 318.

Scheme table 306 holds characteristics and other information necessary for generating each activation signal. Scheme table 306 includes a plurality of rolling code entries, one of which is indicated by 320, and a plurality of fixed code entries, one of which is indicated by 322. Each rolling code entry 320 includes type code 324, transmitter identifier 62, counter 106, crypt key 100, frequency 326, and subroutine address 328. Type code 324 indicates the type of scheme. A type code of zero indicates rolling code. Frequency 326 represents the activation signal carrier frequency. Subroutine address 328 points to code executable by control logic 228 for generating an activation signal. Additional characteristics may be embedded within this code. Each fixed code entry 322 includes type code 324, frequency 326 and subroutine address 328. For fixed codes, type code 324 indicates the number of bits in a fixed code value. Next pointer 330 points to the next open location after scheme table 306. Any new schemes received by control logic 228 may be appended to scheme table 306 using next pointer 330.

The configuration of subset table 304 and scheme table 306 permits adding and changing subsets 314 and schemes 320, 322. New schemes may be added to any subset 314 by incrementing subset count 318 and inserting scheme address 310 following subset count 318. New schemes may be added at next pointer 330. Information for changing subset table 304 and scheme table 306 may be received by controller 30 through wireless telephone connection, wireless data connection, serial or parallel wired connection, or the like.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of programming a vehicle-based remote control to activate an appliance, the appliance responding to a radio frequency activation signal having characteristics represented by one of a plurality of activation schemes, the method comprising:

automatically prompting the user to select one of a plurality of subsets of possible activation schemes, at least one of the plurality of subsets including more than one but less than all of the possible activation schemes;

receiving user input selecting a particular subset of the plurality of subsets;

for each of at least one activation scheme in the particular subset, transmitting an activation signal having characteristics represented by the activation scheme;

receiving user input indicating whether or not the at least one transmitted activation signal successfully activated the appliance;

if the user input indicates success, storing data representing the at least one activation scheme associated with one of at least one user activation input channel; and if the user input indicates no success and if the particular subset includes at least one untried activation scheme, repeating transmitting an activation signal and receiving user input indicating success.

2. The method of claim 1 wherein automatically prompting the user comprises displaying an image of each possible existing appliance remote control transmitter together with a code representative of that transmitter.

3. The method of claim 2 wherein receiving the user input selecting the particular subset comprises receiving the code representative of a user selected transmitter.

4. The method of claim 1 wherein automatically prompting the user comprises displaying an image of at least one possible existing appliance remote control transmitter on an in-vehicle interactive display.

5. The method of claim 4 wherein the interactive display has at least one selection control, receiving the user input selecting the particular subset comprises receiving a signal from at least one selection control indicating selection of a displayed image.

6. The method of claim 1 wherein automatically prompting the user comprises asking the user to speak a name associated with the appliance.

7. The method of claim 1 wherein receiving the user input selecting the particular subset comprises receiving a spoken name associated with the appliance.

8. The method of claim 1 wherein automatically prompting the user comprises signaling the user to enter on a telephone keypad at least a portion of a name associated with the appliance.

9. The method of claim 1 wherein receiving the user input selecting the particular subset comprises receiving characters entered on a telephone keypad indicating at least a portion of a trade name associated with the appliance.

10. The method of claim 1 further comprising:

determining that the particular subset selected by the user includes a rolling code scheme; and automatically prompting the user to put the appliance in learn mode.

11. The method of claim 1 wherein the particular subset selected by the user includes a fixed code scheme, the method further comprising automatically prompting the user to manually enter the fixed code.

12. The method of claim 1 wherein the particular subset selected by the user includes a fixed code scheme, the method further comprising automatically prompting the user to operate an existing transmitter, the existing transmitter operative to transmit an activation signal activating the appliance.

13. The method of claim 1 wherein the particular subset selected by the user includes a fixed code scheme, the method further comprising transmitting a sequence of activation signals, each activation signal in the sequence based on a different fixed code value.

14. The method of claim 1 wherein, if the user input indicates no success and if no other activation scheme in the particular subset remains, switching to a help mode.

15. A method of activating an appliance comprising:

when in a learn mode, receiving first user input selecting one of a plurality of possible appliance classes;

transmitting at least one activation signal, each transmitted activation signal based on characteristics of a member of the selected class;

storing data representing characteristics of at least one transmitted activation signal based on receiving second user input indicating that at least one of the at least one transmitted activation signal activated the appliance, the data associated with one of at least one activation inputs;

when in an operate mode, receiving one of at least one activation inputs;

retrieving stored data representing activation signal characteristics; and transmitting at least one activation signal based on the retrieved data.

16. The method of claim 15 further comprising displaying information about the appliance classes on an in-vehicle display.

17. The method of claim 15 further comprising providing information about the appliance classes through an in-vehicle speaker.

18. The method of claim 15 wherein the first user input is received through at least one activation input.

19. The method of claim 15 wherein the first user input is received through a telephone keypad.

20. The method of claim 15 wherein the first user input is received through a speech recognizer.

21. The method of claim 15 wherein the first user input is received through an instrument panel control.

22. The method of claim 15 further comprising:

determining that the selected class describes at least one rolling code appliance; and prompting the user to put the appliance in learn mode.

23. The method of claim 15 wherein the selected class describes at least one fixed code appliance, the method including prompting the user to manually enter an appliance fixed code value.

24. The method of claim 15 wherein the selected class describes at least one fixed code appliance, the method including prompting the user to operate an existing transmitter, the existing transmitter operative to transmit an activation signal activating the appliance.

25. The method of claim 15 wherein the selected class describes at least one fixed code appliance, transmitting at least one activation signal comprises transmitting a plurality of activation signals, each transmitted activation signal having a different fixed code value.

26. The method of claim 15 further comprising changing to a help mode if an activation signal for each member of the selected class has been transmitted and the second user input is not received.

27. A programmable appliance remote control comprising:

a user interface;

a transmitter operative to transmit radio frequency activation signals;

a memory holding a plurality of activation schemes, each activation scheme assigned to one of a plurality of subsets, at least one of the plurality of subsets being assigned more than one of the plurality of activation schemes; and control logic operative in a learn mode and an operate mode, the control logic in the learn mode accepting a subset selection, transmitting at least one activation signal having characteristics specified by the selected subset, accepting a user selection input selecting at least one activation scheme in response to the at least one transmitted activation signal, and storing data representing the user selection associated with one of at least one activation input, the control logic in an operate mode receiving an activation input through the user interface and transmitting at least one activation signal using stored data based on the received activation input.

28. The programmable appliance remote control of claim 27 wherein the control logic is linked to at least one interface device through a vehicle-based bus.

* * * * *